US010277882B2

(12) United States Patent
Lu

(10) Patent No.: US 10,277,882 B2
(45) Date of Patent: Apr. 30, 2019

(54) VIRTUAL REALITY SCENE IMPLEMENTATION METHOD AND A VIRTUAL REALITY APPARATUS

(71) Applicant: Beijing Pico Technology Co., Ltd., Beijing (CN)

(72) Inventor: Nian Lu, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 269 days.

(21) Appl. No.: 15/240,779

(22) Filed: Aug. 18, 2016

(65) Prior Publication Data

US 2017/0193703 A1 Jul. 6, 2017

(30) Foreign Application Priority Data

Dec. 31, 2015 (CN) .......................... 2015 1 1021451

(51) Int. Cl.
*H04N 13/156* (2018.01)
*G06T 15/10* (2011.01)
(Continued)

(52) U.S. Cl.
CPC ................................ *H04N 13/156* (2018.05)

(58) Field of Classification Search
CPC ..... G06T 19/006; G06T 19/00; H04N 13/044; H04N 13/0497; H04N 13/156; H04N 13/04
(Continued)

(56) References Cited

U.S. PATENT DOCUMENTS 9,251,621 B2 * 2/2016 Robinson ................ G06T 15/20
9,551,873 B2 * 1/2017 Zalewski .................. G06F 3/01
(Continued)

FOREIGN PATENT DOCUMENTS

CN 101414383 A 4/2009
CN 103877726 A 6/2014

OTHER PUBLICATIONS

Office Action in corresponding Chinese Patent Application No. 201511021451, dated Feb. 28, 2017, including English language translation (17 pages).
(Continued)

*Primary Examiner* — Reza Aghevli
(74) *Attorney, Agent, or Firm* — Michele V. Frank; Venable LLP

(57) ABSTRACT

The present invention discloses a virtual reality scene implementation method comprising: creating left and right eye screens, wherein the size, proportion and position of the left and right eye screens are completely consistent; parsing and loading an environmental model; adjusting parameters of the environmental model and/or synchronously adjusting attributes of the left and right eye screens to mutually match the model and the left and right eye screens for forming an initial VR scene; and obtaining a 3D molivideo, intercepting image of each frame of the molivideo and splitting the image into left and right halves; sequentially drawing the left and right half images of each frame on the screens respectively for forming a final VR scene. The present invention further discloses a virtual reality apparatus. And the invention provides a technical solution for users to set a virtual reality scene by themselves.

10 Claims, 1 Drawing Sheet

(51) Int. Cl.
*G06F 3/01* (2006.01)
*H04N 13/383* (2018.01)
*H04N 13/243* (2018.01)
*G06T 19/20* (2011.01)
*G06T 19/00* (2011.01)
*G09G 3/00* (2006.01)

(58) Field of Classification Search
USPC .......................................................... 348/53
See application file for complete search history.

(56) References Cited

U.S. PATENT DOCUMENTS

| | | | | |
|---|---|---|---|---|
| 9,857,939 | B2* | 1/2018 | Webb | G06F 3/0482 |
| 9,883,174 | B2* | 1/2018 | Seidl | G06T 15/10 |
| 10,073,516 | B2* | 9/2018 | Larsen | G06F 3/012 |
| 10,171,792 | B2* | 1/2019 | Liu | H04M 1/72527 |
| 2015/0348327 | A1* | 12/2015 | Zalewski | G06F 3/01 |
| | | | | 345/419 |
| 2016/0209658 | A1* | 7/2016 | Zalewski | G06F 3/01 |
| 2016/0269712 | A1* | 9/2016 | Ostrover | H04S 7/302 |
| 2016/0300388 | A1* | 10/2016 | Stafford | A63F 13/211 |
| 2016/0353089 | A1* | 12/2016 | Gallup | G02B 27/0172 |
| 2017/0039765 | A1* | 2/2017 | Zhou | G06T 19/006 |
| 2017/0061704 | A1* | 3/2017 | Gewicke | G06T 19/006 |
| 2017/0200252 | A1* | 7/2017 | Nguyen | G06F 3/013 |
| 2017/0221264 | A1* | 8/2017 | Perry | H04N 13/344 |
| 2017/0295357 | A1* | 10/2017 | Yang | H04M 1/72527 |
| 2018/0018806 | A1* | 1/2018 | Li | G06F 3/011 |

OTHER PUBLICATIONS

Office Action in corresponding Chinese Patent Application No. 201511021451, dated Nov. 13, 2017, including English language translation (18 pages).
Office Action in corresponding Chinese Patent Application No. 201511021451, dated May 11, 2018, including English language translation (8 pages).

* cited by examiner

VIRTUAL REALITY SCENE IMPLEMENTATION METHOD AND A VIRTUAL REALITY APPARATUS

REALITY APPARATUS

The present invention relates to a virtual reality technology, and in particular, to a virtual reality scene implementation method and a virtual reality apparatus.

BACKGROUND OF THE INVENTION

Currently, the majority of virtual reality products on sale are designed based on a specific scene. The virtual reality scenes which users enter every time are the same, and users cannot switch to a scene expected. This makes users easily have a sense of boredom after losing a feeling of freshness, thus losing interest in virtual reality products and resulting in a decline of users' viscosity for the products, which is not what companies and individuals developing the products expect. As a result, it is necessary to provide a technical solution for users to set a virtual reality scene by themselves.

SUMMARY OF THE INVENTION

One object of this invention is to provide a new technical solution for implementing a virtual reality scene for users to set a virtual reality scene by themselves.

According to a first aspect of the present invention, there is provided a virtual reality scene implementation method, comprising the following steps: creating a left eye screen and a right eye screen, wherein the size, the proportion and the position of the left eye screen and the right eye screen are completely consistent; parsing and loading an environmental model; adjusting parameters of the environmental model and/or synchronously adjusting attributes of the left and right eye screens to mutually match the environmental model and the left and right eye screens for forming an initial virtual reality scene; and obtaining a 3D molivideo, intercepting image of each frame of the 3D molivideo and splitting the image into a left half and a right half, drawing in sequence the left half image and the right half image of each frame on the left eye screen and the right eye screen respectively for forming a final virtual reality scene.

Preferably, adjusting parameters of the environmental module and/or synchronously adjusting attributes of the left and right eye screens are performed by means of a Bluetooth handle.

Preferably, the environmental model is one of a fbx model, an obj model, a md2 model, a md3 model and a md1 model.

According to a second aspect of the present invention, there is provided a virtual reality implementation apparatus, comprising the following modules: a screen creating module, used for creating a left eye screen and a right eye screen, wherein the size, the proportion and the position of the left eye screen and the right eye screen are completely consistent; an environmental model parsing and loading module, used for analyzing and loading an environmental module; a matching module, used for adjusting parameters of the environmental module and/or synchronously adjusting attributes of the left and right eye screens to mutually match the environmental module and the left and right eye screens for forming an initial virtual reality scene; and a 3D molivideo processing module, used for obtaining a 3D molivideo, intercepting image of each frame of the 3D molivideo and splitting the image into a left half and a right half, drawing in sequence the left half image and the right half image of each frame on the left eye screen and the right eye screen respectively for forming a final virtual reality scene.

Preferably, the virtual reality apparatus further comprises a Bluetooth module for receiving adjustment commands.

Preferably, the environmental module is any of a fbx model, an obj model, a md2 model, a md3 model and a md1 model.

Preferably, the virtual reality apparatus is one of a computer, a smart television and a smartphone.

Preferably, the virtual reality apparatus further comprises 3D glasses.

Preferably, the virtual reality apparatus is a virtual reality helmet.

The present invention provides a new technical solution for implementing a virtual reality scene, enabling users to set by themselves a personized scene for a virtual reality product based on personal preference. And users can obtain totally different impressions every time entering a virtual reality world, which greatly extends the duration of a user's sense of freshness for the products and increases a user's viscosity.

The inventors of the present invention have found that, in the prior art, there is no technical solution for users to set a virtual reality scene by themselves. So, the task to be implemented by or the technical problem to be solved by the present invention has not been conceived or anticipated by a person skilled in the art and thus the present invention is a new solution.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
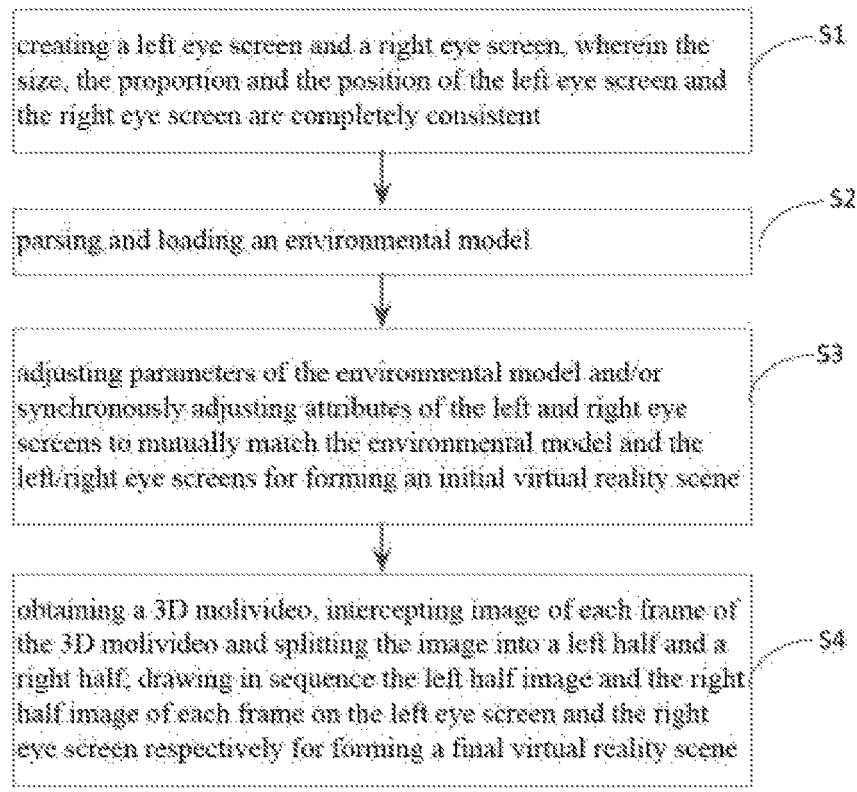
FIG. 1 is a flow chart of an implementation method of a virtual reality scene according to an embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

The present invention provides a technical solution for implementing a virtual reality scene, forming a virtual reality scene using the existing 3D molivideo resources combined with an environmental model.

Referring to FIG. 1, the present invention provides an implementation method of a virtual reality scene, comprising the following steps:

S1: creating a left eye screen and a right eye screen, wherein the size, the proportion and the position of the left eye screen and the right eye screen are completely consistent.

As a result of requirement of the stereo vision of two eyes and particularity of the 3D molivideo image, it needs to create a left eye screen and a right eye screen to project a left half image and a right half image of the 3D molivideo image, respectively. And the information such as the size, the proportion and the position in the space of the two screens are completely consistent.

S2: parsing and loading an environmental model.

The environment model file can be pre-stored in the virtual reality apparatus or obtained by means of downloading. The type of the environment model file can be any of a fbx model, an obj model, a MD2 model, a md3 model, a md1 model. After obtaining the environmental model file, the environmental model is parsed and loaded.

S3: adjusting parameters of the environmental model and/or synchronously adjusting attributes of the left and right eye screens to mutually match the environmental model and the left and right eye screens for forming an initial virtual reality scene;

Synchronously adjusting attributes of the left and right eye screens indicates that the attributes of the left eye screen and the right eye screen should be adjusted synchronously, that is to say, the attributes of the left eye screen and the right eye screen should be consistent after the adjustment. The attributes of the left and right eye screens are the position, the size and the proportion of the screens, for example.

It can only adjust parameters of the environment model for enabling the environmental model to be adapted to the left and right eye screens or only adjust the attributes of the left and right eye screens for enabling the left and right eye screens to be adapted to the environmental model, or adjust simultaneously the parameters of the environmental model and the attributes of the left and right eye screens for enabling them to match each other.

The adjustment commands can be input by means of a Bluetooth handle or pre-set adjustment algorithms in the virtual reality apparatus, and the attributes of the left and right eye screens can be calculated automatically according to the parameters of the environment model, or the parameters of the environment model can be calculated automatically according to the attributes of the left and right eye screens, and then corresponding adjustment operation can be performed automatically.

S4: obtaining a 3D molivideo, intercepting image of each frame of the 3D molivideo and splitting the image into a left half and a right half, drawing in sequence the left half image and the right half image of each frame on the left eye screen and the right eye screen respectively for forming a final virtual reality scene.

Figure 2:
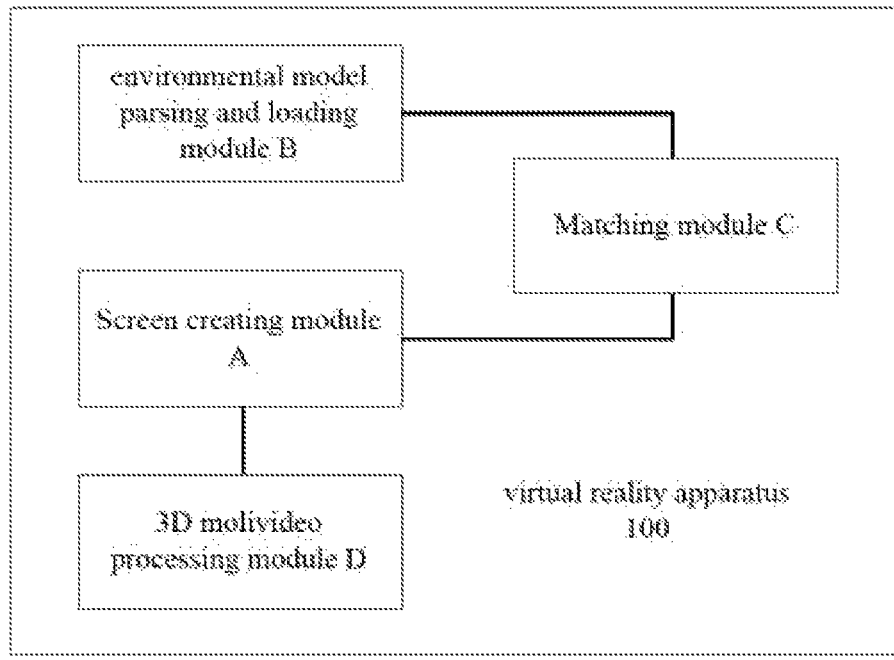
FIG. 2 is a block diagram of a virtual reality apparatus according to an embodiment of the present invention.

Referring to FIG. 2, corresponding to the implementation method of a virtual reality scene in the invention, the present invention further provides a virtual reality apparatus 100, comprising the following modules:

a screen creating module A, used for creating a left eye screen and a right eye screen, and the size, the proportion and the position of the left eye screen and the right eye screen are completely consistent.

an environmental model parsing and loading module B, used for parsing and loading an environmental model. The environment model file can be pre-stored in the virtual reality apparatus or obtained by means of downloading. And, the type of the environment model file can be any of a fbx model, an obj model, a MD2 model, a md33 model and a md1 model.

a matching module C, used for adjusting parameters of the environmental model and/or synchronously adjusting attributes of the left and right eye screen to mutually match the environmental model and the left and right eye screens for forming an initial virtual reality scene. Synchronously adjusting attributes of the left and right eye screens indicates that the attribute of the left eye screen and the right eye screen should be adjusted synchronously, that is to say, the attributes of the left eye screen and the right eye screen should be consistent after the adjustment. And the attributes of the left and right eye screens are the position, the size and the proportion of the screens, for example.

The matching module C can only adjust parameters of the environment model for enabling the environmental model to be adapted to the left and right eye screens or only adjust the attributes of the left and right eye screens for enabling the left and right eye screens to be adapted to the environmental model, or adjust simultaneously the parameters of the environmental model and the attributes of left and right eye screens for enabling them to match each other.

The matching module C can input the adjustment commands by means of a Bluetooth handle or pre-set adjustment algorithms in the virtual reality apparatus, and the attributes of the left and right eye screens can be calculated automatically according to the parameters of the environment model or the parameters of the environment model can be calculated automatically according to the attributes of the left and right eye screens, and then corresponding adjustment operations can be performed automatically.

a 3D molivideo processing module D, used for obtaining a 3D molivideo, intercepting image of each frame of the 3D molivideo and splitting the image into a left half and a right half; drawing in sequence the left half image and the right half image of each frame on the left eye screen and the right eye screen respectively for forming a final virtual reality scene.

The virtual reality apparatus may further include a Bluetooth module, through which the virtual reality apparatus receives adjustment commands and sends to the matching module for adjusting according to the adjustment commands. The Virtual reality apparatus of the present invention may be used together with a Bluetooth handle, and users can operate objects in the virtual reality environment through the Bluetooth handle.

The virtual reality apparatus of the present invention may be provided with a display screen, for example. The virtual reality apparatus of the present invention may be a PC, a smart TV or a smartphone. The virtual reality apparatus presents directly the final virtual reality scene, and users can enter the virtual reality scene by wearing 3D glasses.

The virtual reality apparatus of the present invention may also transmit the final virtual reality scene to an external terminal equipment, and the final virtual reality scene is presented by the screen of the external terminal equipment. A user can enter the virtual reality scene by wearing 3D glasses. For example, the terminal equipment can be a smartphone, a smart TV, etc.

The virtual reality apparatus of the present invention may also be a virtual reality helmet with a display screen and lenses arranged inside, and a use only need to wear the virtual reality helmet to enter a virtual reality scene.

The present invention provides a new technical solution for implementing a virtual reality scene, enabling users to set by themselves a personized scene for a virtual reality product based on personal preference. And, users can obtain totally different impressions every time entering a virtual reality world, which greatly extends the duration of user's sense of freshness for the products and increases user's viscosity.

Those skilled in the art can appreciate that the aforementioned units or modules may be implemented in various manners. For example, a processor may be configured with instructions to implement the screen creating module, the environmental model parsing and loading module, the matching module and the 3D molivideo processing module. And the aforementioned modules may be separate units or may be combined together in one implementation.

The present invention may be a system, a method, and/or a computer program product. The computer program product may include a computer readable storage medium (or media) having computer readable program instructions thereon for causing a processor to carry out aspects of the present invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

What is claimed is:

1. A virtual reality scene implementation method, wherein the method is performed by a processor in a virtual reality apparatus configured with instructions and comprises the following steps:

creating, by the processor configured with the instructions, a left eye screen and a right eye screen, wherein the size, the proportion and the position of the left eye screen and the right eye screen are completely consistent;

parsing and loading, by the processor configured with the instructions, an environmental model;

adjusting, by the processor configured with the instructions, parameters of the environmental model and/or synchronously adjusting attributes of the left and right eye screens to mutually match the environmental model and the left and right eye screens for forming an initial virtual reality scene, wherein adjustment algorithms are pre-set in the virtual reality apparatus, and the attributes of the left and right eye screens are calculated automatically according to the parameters of the environment model, or the parameters of the environment model are calculated automatically according to the attributes of the left and right eye screens, to perform corresponding adjustment operation automatically; and obtaining an existing 3D molivideo, intercepting image of each frame of the 3D molivideo, splitting the image into a left half and a right half, and drawing in sequence the left half image and the right half image of each frame on the left eye screen and the right eye screen, respectively, by the processor configured with the instructions, for forming a final virtual reality scene.

2. The virtual reality scene implementation method according to claim 1, wherein the environmental model is one of a fbx model, an obj model, a md2 model, a md3 model and a md1 model.

3. A virtual reality apparatus, comprising a processor and memory for storing instructions, wherein the processor is configured with the instructions to implement the following modules:

a screen creating module, used for creating a left eye screen and a right eye screen, wherein the size, the proportion and the position of the left eye screen and the right eye screen are completely consistent;

an environmental model parsing and loading module, used for parsing and loading an environmental model;

a matching module, used for adjusting parameters of the environmental model and/or synchronously adjusting attributes of the left and right eye screens to mutually match the environmental model and the left and right eye screens, for forming an initial virtual reality scene, wherein the matching module pre-sets adjustment algorithms in the virtual reality apparatus, wherein the attributes of the left and right eye screens are calculated automatically according to the parameters of the environment model, or the parameters of the environment model are calculated automatically according to the attributes of the left and right eye screens, to perform corresponding adjustment operation automatically;

a 3D molivideo processing module, used for obtaining an existing 3D molivideo, intercepting image of each frame of the 3D molivideo and splitting the image into a left half and a right half; drawing in sequence the left half image and the right half image of each frame on the left eye screen and the right eye screen, respectively, for forming a final virtual reality scene.

4. The virtual reality apparatus according to claim 3, wherein the environmental model is any of a fbx model, an obj model, a md2 model, a md3 model, a md1 model.

5. The virtual reality apparatus according to claim 3, wherein the virtual reality apparatus is one of a computer, a smart television and a smartphone.

6. The virtual reality apparatus according to claim 4, wherein the virtual reality apparatus is one of a computer, a smart television and a smartphone.

7. The virtual reality apparatus according to claim 5, wherein the virtual reality apparatus further comprises 3D glasses.

8. The virtual reality apparatus according to claim 6, wherein the virtual reality apparatus further comprises 3D glasses.

9. The virtual reality apparatus according to claim 3, wherein the virtual reality apparatus is a virtual reality helmet.

10. The virtual reality apparatus according to claim 4, wherein the virtual reality apparatus is a virtual reality helmet.

* * * * *